United States Patent [19]

Nagasawa et al.

[11] Patent Number: 5,140,570
[45] Date of Patent: Aug. 18, 1992

[54] CIRCUIT AND METHOD FOR SEARCHING TRACK ON CD

[75] Inventors: Naobumi Nagasawa; Hiroyuki Arai, both of Gunma, Japan

[73] Assignee: Sanyo Electric Co., Ltd., Osaka, Japan

[21] Appl. No.: 325,255

[22] Filed: Mar. 17, 1989

[30] Foreign Application Priority Data

Mar. 18, 1988 [JP] Japan .................. 63-66343

[51] Int. Cl.⁵ .................. G11B 7/00; G11B 21/08
[52] U.S. Cl. .................. 369/32; 369/43; 369/44.28; 369/44.25; 369/54; 360/78.04
[58] Field of Search ......... 369/32, 43, 44.28, 44.25, 369/54, 124; 360/78.04, 78.06, 78.09, 78.11, 78.14

[56] References Cited

U.S. PATENT DOCUMENTS 4,694,441 9/1987 Tomisawa et al.
4,899,325 2/1990 Katsuhara et al. .................. 369/32

FOREIGN PATENT DOCUMENTS 0181436 5/1986 European Pat. Off.
EPA0257595 3/1988 European Pat. Off.

Primary Examiner—Roy N. Envall, Jr.
Assistant Examiner—Robert Chevalier
Attorney, Agent, or Firm—Stanger Stempler & Dreyfus

[57] ABSTRACT

A track search circuit includes a command decoder which decodes command data sent by a microcomputer and stored in a command register and outputs signals commanding a track jump and commanding count of a counter which counts a tracking error signal. Time difference between a present A-time and a target A-time is calculated such that an optical pick-up can be moved toward a target position by utilizing the track jump of $4^n$. When a counted value of the counter reaches a predetermined value, the A-time is renewed such that the time difference can be reduced by addition or subtraction suitable time data to or from the A-time. If the renewed A-time becomes within 1 minute with respect to the target A-time in repeating such a track jump in accordance with the renewed A-time, the optical pick-up is stopped to move, and the A-time is read to jump the optical pick-up again to catch the target position.

3 Claims, 6 Drawing Sheets

CIRCUIT AND METHOD FOR SEARCHING TRACK ON CD

BACKGROUND OF THE INVENTION

1. Field of the Invention

The present invention relates to a circuit and method for searching a track on a CD. More specifically, the present invention relates to an IC track search circuit for processing and controlling signals in a CD (compact disc) player, and a track search method for rapidly finding a cue of a piece of music.

2. Description of the Prior Art

In the data format of a CD, subcodes are formed in respective frames. A subcode Q within the subcodes includes the number of pieces of music, indexes and time information. Therefore finding a cue of a piece of music involves reading and utilizing the subcode Q, and moving or feeding an optical pick-up toward a target position.

Conventionally, the process of finding a cue of music (search) and moving the optical pick-up to a set target position encompasses calculating the target time to the target position to evaluate the time difference between the time represented by the time information of the subcode Q which has been presently read and the target time, and evaluating the amount of movement, i.e. the moving amount of the optical pick-up so as to make the time difference of approximately zero. Then, the optical pick-up is moved by using the moving amount as a control target. More specifically, setting a time period equal to an evaluated moving amount in a timer and moving the optical pick-up until the timer counts the time period set in the timer allows the optical pick-up to catch or capture the target position.

Such a search method is disclosed in Japanese Patent Application Laid-open No. 83272/1985.

In the above described method, the track number, a cue of index, and etc. are directed to a control device such as a microcomputer by means of key operation, but it is not easy to calculate and evaluate the time period to the target position in accordance with such information because of the size of the necessary program. Another disadvantage, arises because the calculation for evaluating the time difference between the time information of the target position and the time information of the subcode Q which has been presently read and for further evaluating a moving time period of the optical pick-up based upon the time difference is quite complex. Thus as the length of the program for such calculation becomes longer the load a the microcomputer increases.

SUMMARY OF THE INVENTION

Therefore, a principal object of the present invention is to provide a novel circuit and method for searching a track on a CD.

Another object of the present invention is to provide a circuit and method for searching a track on a CD, wherein a track of a CD is rapidly searched without any complex and long, large program for a control means such as a microcomputer.

A track search circuit in accordance with the present invention comprises a command register which stores command data and numeral data indicative of a predetermined value N from an external control circuit; a command decoder which detects command data commanding count of the track number, command data commanding a track jump by $4^n$ ($n=0, 1, 2, \ldots$) in an outward direction, and command data commanding a track jump by $4^n$ ($n=0, 1, 2, \ldots$) in an inward direction, and outputs respective detection outputs; a counter which counts tracking error signal being applied from an external; a selection circuit which receives an output of the counter and a detection output from the command decoder and selectively outputs the output of the counter based upon the detection output; a tracking control pulse generation circuit which gives an acceleration pulse or deceleration pulse to a tracking servo circuit which controls a means for reading information from the track based upon an output of the selection circuit; a coincidence detection circuit which receives the output of the counter and an output of the command register and generates a first detection output in response to detection that a counted value of the counter becomes a value M smaller than the predetermined value N and a second detection output in response to detection that the counted value of the counter becomes equal to the predetermined value N; a flip-flop which is reset by the first detection output of the coincidence detection circuit, an output of which being applied to an external terminal; and a reset circuit which resets the counter and the flip-flop, said reset circuit being enabled in response to the detection output which is outputted from the command decoder when the same detects the command data commanding count of the predetermined value N such that operation of the tracking control pulse generation circuit can be stopped.

By applying the command data commanding the count of the track number and the predetermined value N, a pulse is outputted from the external terminal at every moment the tracks of the predetermined value N are counted, and by applying the command data commanding a $4^n$-track jump, the acceleration pulse or deceleration pulse is outputted.

Furthermore, by utilizing the above described track search circuit, a track search method capable of rapidly searching a track is implemented, wherein real time in calculation is obtained by addition or subtraction of predetermined time in accordance with a pulse outputted at every timing when the predetermined value N is counted until the real time in calculation reaches real time of a target point, search operation is stopped once when the real time in calculation reaches the real time of the target point, then, the real time of that point is read from the track, and therafter, the target point is found out by repeating the $4^n$-track jump and reading of the real time at every jumped point.

When the external control circuit (for example, a microcomputer) starts to search by applying the command data commanding count of tracks and the numeral value data indicative of the predetermined value N to the command register, operations that the flip-flop is set by the first detection output of the coincidence detection circuit when the counter counts the tracking error signals up to the predetermined value M (M<N) and that the counter and the flip-flop are reset by the reset signal which is outputted from the reset circuit in response to the second detection output of the coincidence detection circuit when the counter counts up to the predetermined value N are repeated, and therefore, a pulse is outputted from the output terminal to which the output of the flip-fop is applied at every timing when the optical pick-up crosses or traverses the tracks of the predetermined value N. By adding or subtracting predetermined time corresponding to the real time read from the track to or from the real time read in advance from the track, based upon the pulse, it is possible to obtain the real time corresponding to the track.

In addition, when the real time in calculation reaches the real time of the target point, by applying from the external control circuit to the command register the command data commanding a track jump of maximum track numbers capable of being represented by $4^n$ in a direction toward the target point, the selection circuit generates an output in response to the detection output outputted from the command decoder when the counted value of the counter becomes equal to $4^n$, and therefore, the tracking control pulse generation circuit outputs and gives the acceleration pulse or deceleration pulse to the tracking servo circuit which controls an actuator of the optical pickup which reads information from the track. By repeating such a track jump from the maximum track numbers to the minimum track numbers capable of being represented by $4^n$, it is possible to find out the target point.

In accordance with the present invention, since it is possible to easily calculate a present A-time (real time) based upon the pulse which is outputted at every timing when the tracks of the predetermined value N are counted, it becomes possible to move the optical pickup straight to the target without reading the A-time from the track in moving the optical pick-up. Furthermore, since by executing a track jump after approaching the target, it is possible to find out the target while the A-time is read from the track, there is advantage that rapid track search can be implemented and such an advantage is very useful. Furthermore, since it is possible to easily calculate the present A-time, there is another advantage that the number of the program steps for the microcomputer can be reduced.

The objects and other objects, features, aspects and advantages of the present invention will become more apparent from the following detailed description of the embodiments of the present invention when taken in conjunction with accompanying drawings.

DETAIL DESCRIPTION OF THE PREFERRED EMBODIMENTS

Figure 1:
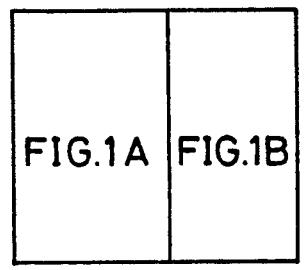
FIGS. 1, 1A and 1B are circuit diagrams showing one embodiment in accordance with the present invention.

FIG. 1 is a circuit diagram showing an embodiment in accordance with the present invention, which is a track search circuit incorporated in an IC for processing and controlling signals used in a CD player.

With reference to FIG. 1, an 8 bit command register 1 receives 8-bit data COD from a microcomputer (not shown) via a data input terminal 2 in a bit-serial fashion in synchronism with a shift clock SCK being applied to an input terminal 3. The data COD is any one of command data commanding the operation and numeral value data indicative of a predetermined value N, but the numeral value data is applied after application of the command data.

A command decoder 4 receives an 8-bit output of the command register 1 and detects what kind of operation is commanded by the command data which is inputted and held in the command register 1. The command data includes command data commanding a track jump and command data commanding count of tracks. The command decoder 4 outputs signals 1T and 1T' for commanding two kinds of a 1-track jump, a signal 4T commanding a 4-track jump, a signal 16T commanding a 16-track jump, a signal 64T commanding a 64-track jump, a signal 256T commanding a 256-track jump, a signal KPI commanding a track jump in an inward direction, and a signal KPO commanding a track jump in an outward direction, respectively, based upon the command data which commands a track jump. At the same time, the command decoder 4 outputs a signal TC commanding the count of the tracks based upon the command data commanding the count of the tracks. In addition, a decoding operation of the command decoder 4 is inhibited as a result of detection of the counted track number after detection of the command data commanding the count of the tracks because the data which is next inputted and held in the command register 1 is the numeral value data.

A counter 5 is a 9-bit counter which counts a tracking error signal TES which is generated when a track is crossed or traversed by a laser beam of an optical pick-up (not shown) for reading information from the tracks of a CD (not shown) in moving the optical pick-up. Outputs of respective bits of the counter 5, that is, an output indicative of a counted value of the counter 5 is applied to a selection circuit 6 which is controlled by the signals 1T, 4T, 16T, 64T and 256T from the command decoder 4.

The selection circuit 6 is constructed by seven (7) AND gates 7 and two (2) OR gates 8. When the counter 5 reaches a counted value which is selected by the signals 1T, 4T, 16T, 64T and 256T, a signal $KPE_1$ for extinguishing an acceleration pulse and $KPE_2$ for extinguishing a deceleration pulse are applied to a tracking control pulse generation circuit 9 from an output of the OR gate 8 through OR gates 10 and 11, respectively.

On the other hand, a timer 13 counts an internal clock pulse $\phi_1$ and outputs an output $T_1$ of 233 μs and an output $t_2$ of 466 μs, and these outputs $t_1$ and $t_2$ are selected by AND gates 15 and 16 and an OR gate 17 which are controlled by an output of an OR gate 14 to which the signals 1T and 1T' from the command decoder 4 are applied and the signal 4T, and an output of the OR gate 17 is applied to the tracking control pulse generation circuit 9 via the OR gate 11.

Furthermore, a timer 18 counts the clock pulse $\phi_1$ and produces an output $t_3$ of 233 μs which is selected by an AND gate 19 being controlled by the signal 1T from the command decoder 4. An output of the AND gate 19 is applied to the tracking control pulse generation circuit 9 via the OR gate 10. This means that the timers 13 and 18 produce a time period during when the laser beam is to be moved by controlling an actuator of the optical pick-up in accordance with command of the command data.

The tracking control pulse generation circuit 9 operates based upon the signal KPI commanding movement in an inward direction and the signal KPO commanding movement in an outward direction both of which are given from the command decoder so as to output a kick pulse KP+ for an inward direction and a kick pulse KP− for an outward direction from terminals 20 and 21, respectively. The tracking control pulse generation circuit 9 includes an OR gate 22 which receives the signals KPI and KPO; a D-FF 22 which generates a signal TRGL for controlling a gain of a servo circuit of the actuator of the optical pick-up; a D-FF 24 which generates the acceleration pulse; a D-FF 25 which generates the deceleration pulse; switching gates 26 and 27 which switch-over whether an output of the D-FF 24, that is, the acceleration pulse is to be the kick pulse KP+ or the kick pulse KP−, or whether an output of the D-FF 25, that is, the deceleration pulse is to be the kick pulse KP+ or the kick pulse KP− in accordance with the signals KPI and KPO; and a D-FF 28 which generates a brake pulse TBKE. Meanwhile, the pulse width of the acceleration pulse and the deceleration pulse can be determined by an output of the counter 5 which is selected by the command data or outputs of the timers 18 and 13.

Figure 2:
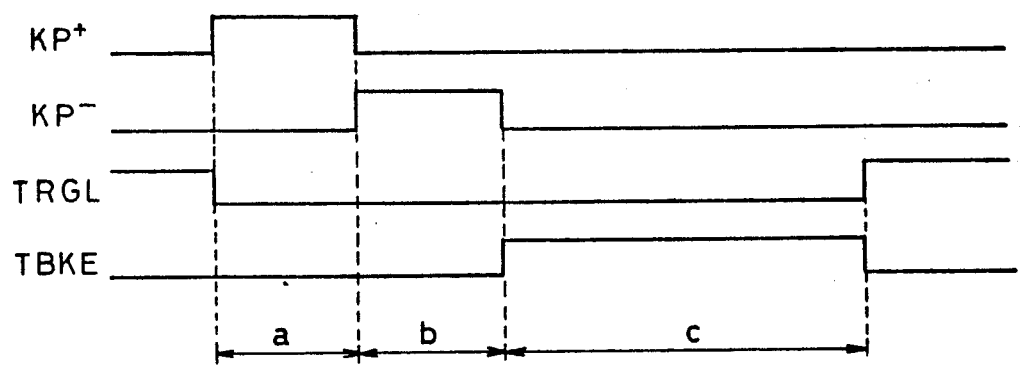
FIG. 2 is a timing chart showing a kick pulse for controlling a track jump.
Figure 1A:
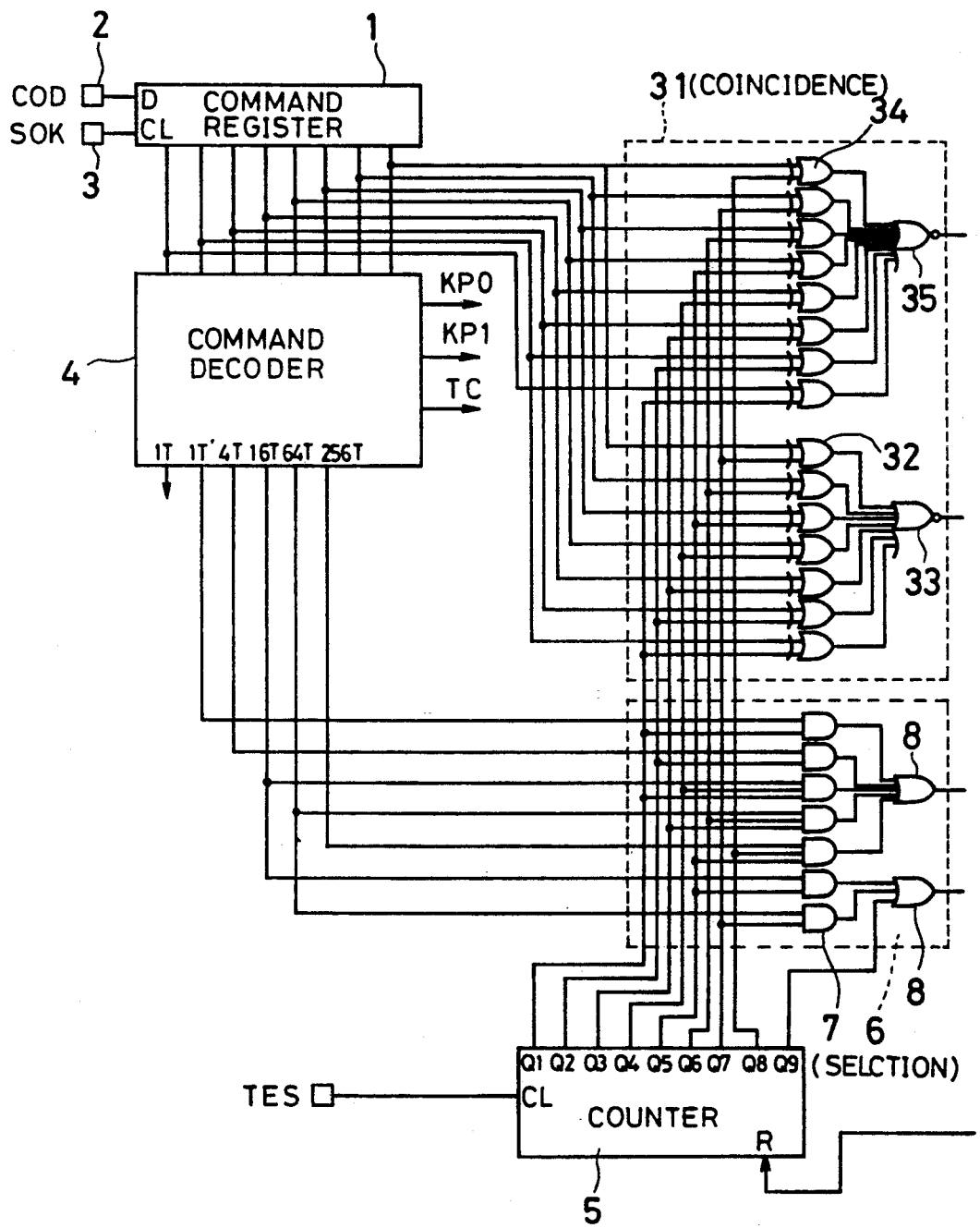
Figure 1B:
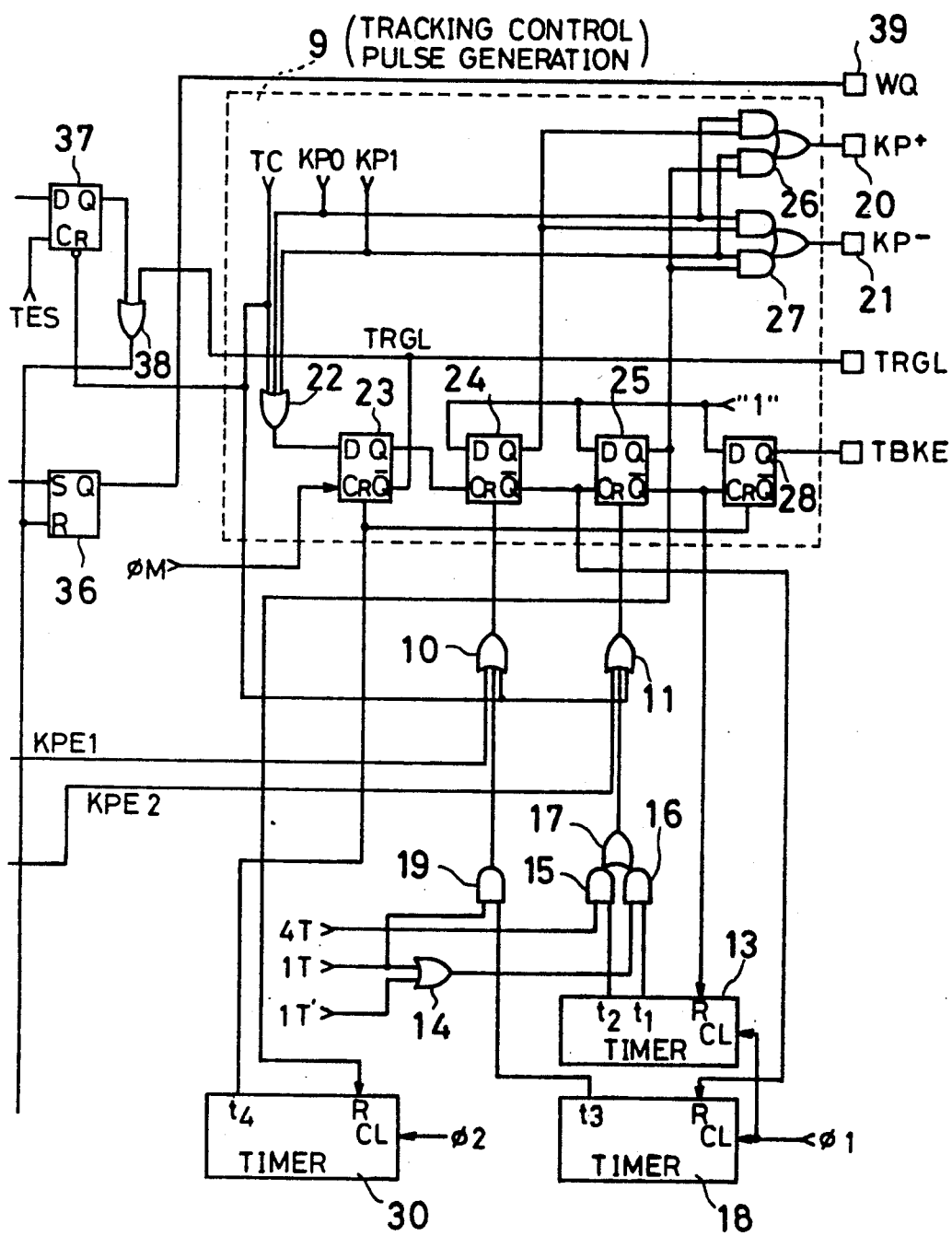
Figure 3:
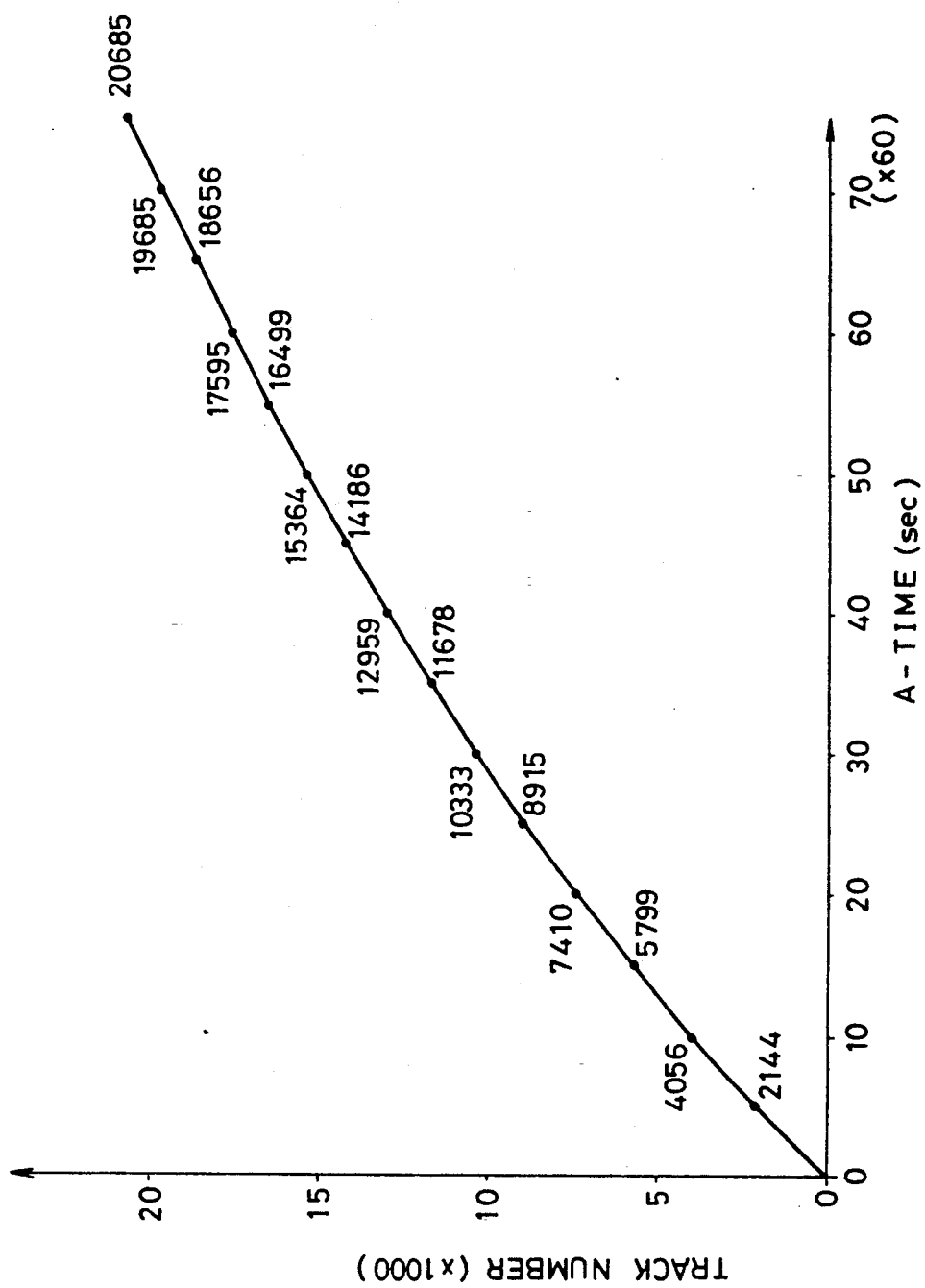
FIG. 3 is a graph showing relationship between the track number in a CD and A-time.

FIG. 2 shows a timing chart in which the kick pulses KP+ and KP− when the signal KPI is outputted, and other pulse are illustrated. As shown in FIG. 2, the D-FF 23 is set when the signal KPI is generated, and the D-FF 24 is set in response to a leading edge of an output Q of the D-FF 23 such that the acceleration pulse is generated as the kick pulse KP+. In addition, an output $\overline{Q}$ of the D-FF 23 is outputted as the gain control signal TRGL for the tracking servo circuit to reduce a servo gain thereof during when the signal TRGL is "0". A time period (a) of the kick pulse KP+ is determined by the command data, and the acceleration pulse is extinguished when the D-FF 24 is reset by the selected output $KPE_1$ of the counter 5 or the output of the timer 18. Furthermore, when the output $\overline{Q}$ becomes "1" by resetting the same, the D-FF 25 is set such that the deceleration pulse is generated as the kick pulse KP−. A time period (b) of the kick pulse KP− is also determined by the command data, and the deceleration pulse is extinguished when the D-FF 25 is reset by the selected output $KPE_2$ of the counter 5 or the output of the timer 13. When the output Q of the D-FF 25 becomes "1" by resetting the same, the D-FF 28 is set so as to output the brake pulse TBKE from the terminal 29. The brake pulse TBKE becomes a timing signal for actuating an operation which includes detecting a slipping direction of the light beam from the optical pick-up and controlling the light beam to prevent it from slipping. In addition, a generation time period of the brake pulse TBKE is determined by a timer 30 shown in FIG. 1. The timer 30 is operated in response to a trailing edge of the output Q of the D-FF 25 when the same is reset so as to output a timer output $t_4$ after 17 msec. The timer output $t_4$ resets the D-FF 23 and the D-FF 28, and therefore, the brake pulse TBKE becomes "0" and the signal TRGL becomes "1". In response to "1" of the signal TRGL, the servo gain of the tracking servo circuit is increased such that the position whereto the optical pick-up is moved, that is, the track at the position designated by the command can be caught or captured.

Table I is representative of the relationship between the command data, contents designated by the command data, a time period (a) of the acceleration pulse, and a time period (b) of the deceleration pulse.

TABLE I

| Data | Command | a | b | c |
|---|---|---|---|---|
| 11 | 1-track jump IN | 233 μs | 233 μs | 17 ms |
| 12 | 1-track jump IN | 0.5 tracks | 233 μs | 17 ms |
| 13 | 4-track jump IN | 2 tracks | 466 μs | 17 ms |
| 14 | 16-track jump IN | 9 tracks | 7 tracks | 17 ms |
| 15 | 64-track jump IN | 36 tracks | 28 tracks | 17 ms |
| 16 | 256-track jump IN | 144 tracks | 112 tracks | 17 ms |
| 19 | 1-track jump OUT | 233 μs | 233 μs | 17 ms |
| 1A | 1-track jump OUT | 0.5 tracks | 233 μs | 17 ms |
| 1B | 4-track jump OUT | 2 tracks | 466 μs | 17 ms |
| 1C | 16-track jump OUT | 9 tracks | 7 tracks | 17 ms |
| 1D | 64-track jump OUT | 36 tracks | 28 tracks | 17 ms |
| 1E | 256-track jump OUT | 144 tracks | 112 tracks | 17 ms |

As shown in the Table I, the command data commanding a 1-track jump includes two kinds of methods in an inward direction and an outward direction, respectively, one of which is the case where the command data is "11" (hexadecimal) or "19" (hexadecimal), when the command data is inputted to the command register 1, the signal 1T is outputted from the command decoder 4. Since the signal 1T selects the output $t_3$ of the timer 18 or the output $t_1$ of the timer 13, the time period (a) of the acceleration pulse becomes 233 μs and the time period (b) of the deceleration pulse also becomes 233 μs. The time period of 233 μs is a time period necessary for moving the optical pick-up by ½ tracks, and evaluated in calculation. On the other hand, in the case where the command data is "12" (hexadecimal) or "1A" (hexadecimal), the signal 1T' is outputted from the command decoder 4. Since the signal 1T' selects the output $Q_1$ of the counter 5 and the output $t_1$ of the timer 13, the time period (a) of the acceleration pulse becomes a time period until the tracking error signal TES is counted by one. This means that since the tracking error signal TES is a pulse which is generated when the light beam exists between adjacent tracks, the time period (a) becomes a time period until the optical pick-up is moved by ½ tracks. In addition, the time period (b) of the deceleration pulse becomes 233 μs similar to the above described case. Such two kinds of the 1-track jump may be used properly in accordance with a characteristic of the optical pick-up, or a characteristic of the tracking servo circuit.

In addition, "13" (hexadecimal) or "1B" (hexadecimal) is the command data commanding 4-track jump in an inward direction or an outward direction. In the case of this command data, the signal 4T is outputted from the command decoder 4. The signal 4T selects the output $Q_2$ of the counter 5 and the output $t_2$ of the timer 13. Therefore, the time period (a) of the acceleration pulse becomes a time period necessary for a 2-track jump and the time period (b) of the deceleration pulse becomes 466 μs. The time period 466 μs is a time period necessary for a 2-track jump, and evaluated in calculation. "14" (hexadecimal) or "1C" (hexadecimal) is the command data commanding a 16-track jump in an inward direction or an outward direction, and the signal 16T which is outputted in this case selects the output $Q_4$ and $Q_1$, and the output $Q_5$ of the counter 5. Therefore, the time period (a) of the acceleration pulse becomes a time period necessary for a 9-track jump and the time period (b) of the deceleration pulse becomes a time period necessary for a 7-track jump. "15" (hexadecimal) or "1D" (hexadecimal) is the command data commanding a 64-track jump, and the signal 64T which is outputted in this case selects the outputs $Q_6$ and $Q_3$, and the output $Q_7$ of the counter 5. Therefore, the time period (a) of the acceleration pulse becomes a time period necessary for a 36-track jump and the time period (b) of the deceleration pulse becomes a time period necessary for a 28- track jump. Furthermore, "16" (hexadecimal) or "1E" (hexadecimal) is the command data commanding a 256-track jump, and the signal 256T which is outputted in this case selects the outputs $Q_8$ and $Q_5$ of the counter 5. In addition, the output $Q_9$ of the counter 5 is applied to OR gate 9 so as always to be selected. Therefore, the time period (a) of the acceleration pulse becomes a time period necessary for a 144-track jump and the time period (b) of the deceleration pulse becomes a time period necessary for a 112-track jump.

Thus, as shown in the table I, it is possible to freely produce the kick pulses KP+ and KP− for making $4^n$ (n=0, 1, 2, 3, 4)-track jump by means of the command data. Furthermore, in FIG. 1, the coincidence detection circuit 31 receives the lower 8-bit output $Q_1$–$Q_8$ of the counter 5 and the 8-bit output of the command register 1. The coincidence detection circuit 31 detects that the counted valued of the counter 5 reaches the predetermined value N and M=N/2 which are indicated by the numeral value data which is inputted and held in the command register 1 after the command data commanding count of the tracks is inputted and held in the same. The coincidence detection circuit 31 includes an E-OR gate 32 which receives the lower 7-bit output of the counter 5 and the lower 7-bit output of the command register 1, a NOR gate 32 which receives an output of the E-OR gate 32, an E-OR gate 34 which receives the lower 8-bit output of the counter 5 and the 8-bit output of the command register 1, and a NOR gate 35 which receives an output of the E OR gate 34.

The E-OR gate 32 and the NOR gate 33 detect that the counted value of the counter 5 reaches N/2 and apply a first detection output to a set input of an R-SFF 36, and the E-OR gate 34 and the NOR gate 35 detect that the counted value of the counter reaches N and apply a second detection output to a D-input of a D-FF 37. The D-FF 37 is a reset circuit which generates a reset signal for the R-SFF 36, and an output Q of which is applied to an input of an OR gate 38 together with the gain control signal TRGL, and an output of the OR gate 38 is applied to a reset input R of the R-SFF 36 and a reset input R of the counter 5. An output Q of the R-SFF 36 is outputted from an external terminal 39 to the external microcomputer as a result WQ of count of the tracks. On the other hand, a signal TC which is outputted from the command decoder 4 when the command data commanding count of the tracks is applied to the OR gate 22 of the tracking control pulse generation circuit 9. The signal TC is further applied to an inverted reset input R of the D-FF 37, and to reset inputs R of the D-FFs 24 and 25 through the OR gates 10 and 11. More specifically, when the command data commanding the count of the tracks is detected, if the signal TC becomes "1", the D-FFs 24 and 25 which generate the acceleration pulse and the deceleration pulse are held in their reset states. However reset of the D-FF 37 is released, and the D-FF 23 takes-in the "1" of the signal TC to output a"0" the servo gain control signal TRGL. In response to the "0" signal TRGL, reset of the counter 5 is released and the counter 5 starts a count operation. Therefore, the R-SFF 36 is set by the first detection output when the counted value of the counter 5 becomes N2 and, when the counted value of the counter 5 becomes N, the output Q of the D-FF 37 is changed to "1" by the second detection output, whereby the R-SFF 36 and the counter 5 are reset. By repeating such operations, the signal WQ becomes a pulse, whose time period is the time period when the counter 5 counts the tracking error signals TES of N. Therefore, it becomes possible to know a moving amount of the optical pick-up based upon the signal WQ.

Now, a method for setting the predetermined value N will be described. In the CD, real time information is included in the subcode Q of the information which is read from the track. The real time indicates real reproducing time from the beginning of the track and is referred to as A-time. Since the CD is rotated at constant linear velocity (CLV), relationship between the A-time and the track number is as follows:

$$\text{Track Number} = (\sqrt{1.92a/\pi + 25^2} - 25)$$

A graph showing such relationship is illustrated in FIG. 4.

In addition, the following table II indicates the case of the A time is divided by time unit of 5 minutes.

TABLE II

| A-Time | Track Numbers for 5 minutes | Track Numbers per second | Seconds | Track Numbers |
|---|---|---|---|---|
| 0–5 | 2144 | 7.147 | 12 | 85.76 |
| 5–10 | 1912 | 6.373 | 13 | 82.849 |
| 10–15 | 1743 | 5.81 | 14 | 81.34 |
| 15–20 | 1611 | 5.37 | 15 | 80.55 |
| 20–25 | 1505 | 5.017 | 16 | 80.272 |
| 25–30 | 1418 | 4.727 | 17 | 80.359 |
| 30–35 | 1345 | 4.483 | 18 | 80.694 |
| 35–40 | 1281 | 4.27 | 19 | 81.13 |
| 40–45 | 1227 | 4.09 | 20 | 81.8 |
| 45–50 | 1178 | 3.927 | 21 | 82.467 |
| 50–55 | 1135 | 3.783 | 22 | 83.226 |
| 55–60 | 1096 | 3.653 | 23 | 84.019 |
| 60–65 | 1061 | 3.637 | 24 | 84.888 |
| 65–70 | 1029 | 3.43 | 25 | 85.75 |
| 70–75 | 1000 | 3.33 | 26 | 86.58 |

In the table II, the track number within respective time units of 5 minutes and average track numbers for 1 second within the respective time units of 5 minutes. In a column where the numeral values of seconds are respectively indicated, 12 seconds is set as the minimum value. If values of seconds which are incremented by 1 second for each time unit, the track number corresponding to the seconds becomes approximately constant track number of "80-87" as indicated in the table II. Therefore, if the predetermined value N is set as "81" in the circuit as shown in FIG. 1, by adding or subtracting the seconds indicated in the column of the seconds corresponding to the time unit of 5 minutes in which the present A-time is included to or from the present A-time at every timing when the pulse of the signal WQ is outputted, the present A-time can be evaluated in calculation. In addition, in the case of an inward direction, that is, where target time is smaller than the present A-time, subtracting calculation is executed.

Figure 4A:
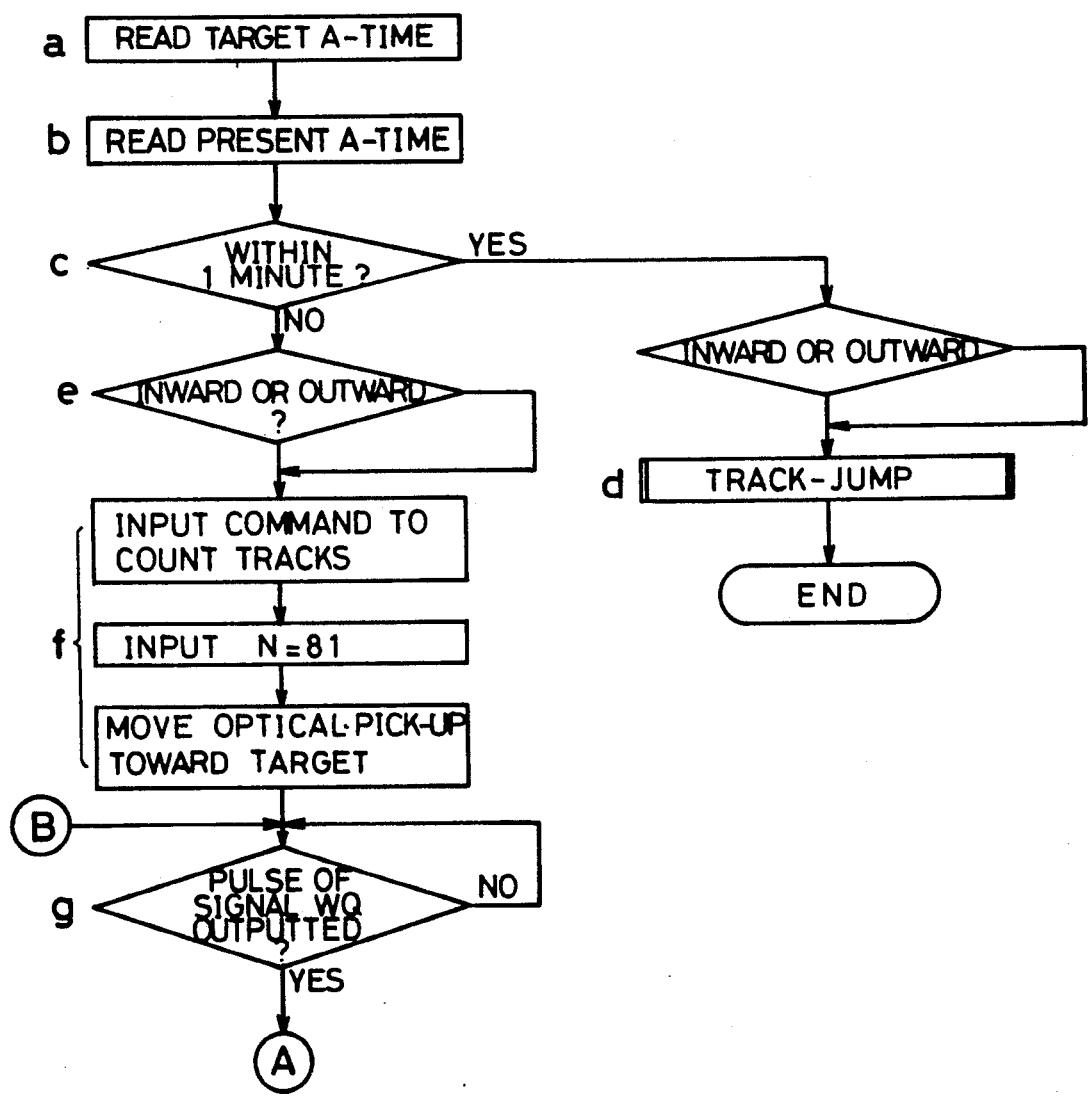
FIG. 4A and FIG. 4B are flowcharts showing an operation for searching a track.
Figure 4B:
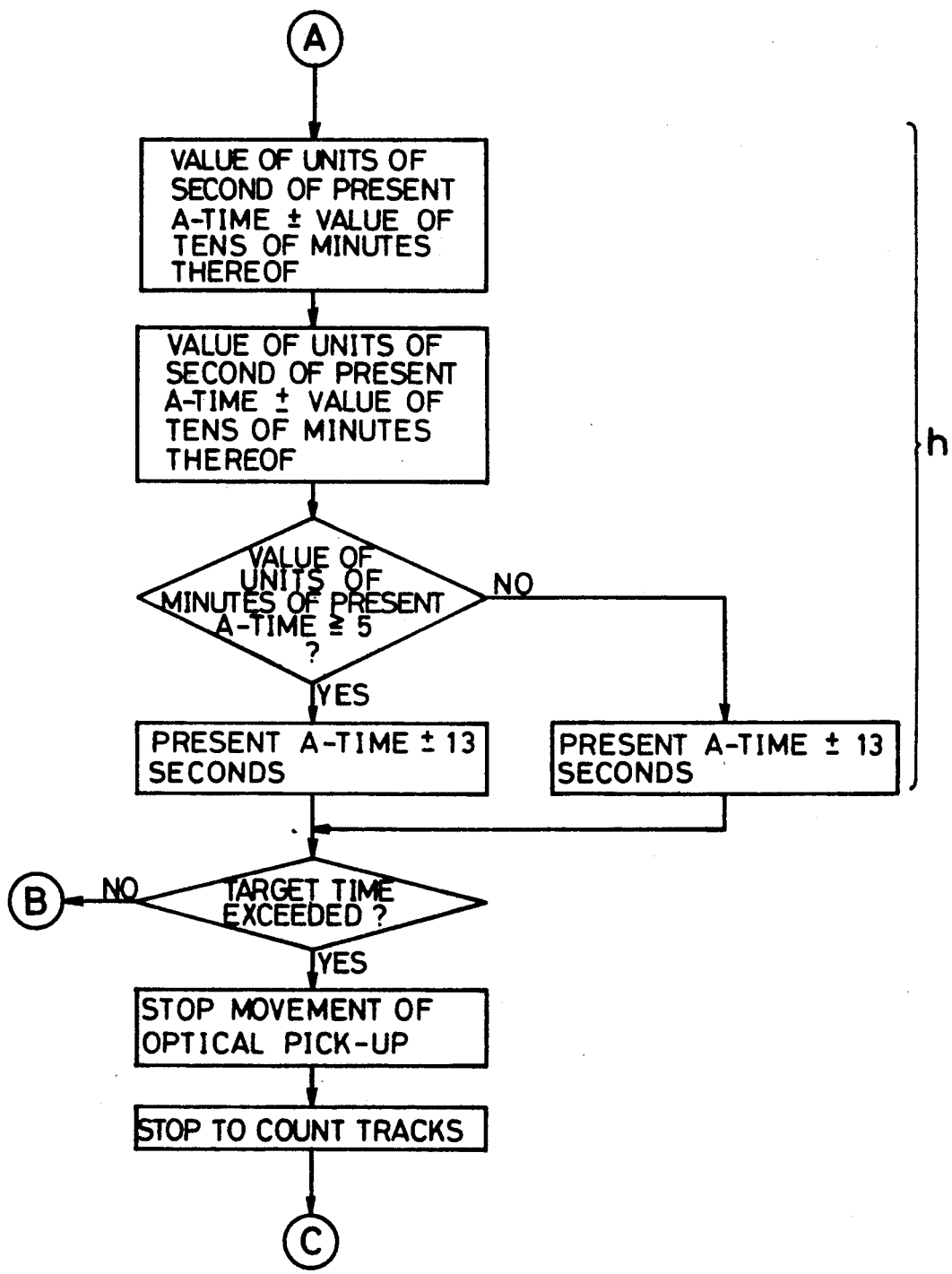

Next, a method for rapidly move the optical pick-up to a target track in a CD player in which an IC incorporating the circuit as shown in FIG. 1 is controlled by a microcomputer will be described with reference to flow charts of FIG. 4A and FIG. 4B.

First, the microcomputer (not shown) reads a target A-time during when the optical pick-up is to be moved (step a). By storing a series of A-time of respective pieces of music included in music information which is recorded in a lead-in area formed inner peripheral of the CD in advance, it is possible to know target A-time as request of the user. Next, present A-time is read from a track which is presently reproduced (step b).

If the present A-time is within 1 minute with respect to the target, the target A-time and the present A-time are compared with each other to determine whether the optical pick-up is to be moved in an outward direction or an inward direction (step c), and track jump function is executed. More specifically, the command data commanding a 256-track jump is given to the command register 1 of FIG. 1 to execute the track jump function (step d). In this case, the present A-time is read from the track for each completion of the track jump, the 256-track jump, 64-track jump, 16-track jump, 4-track jump and 1-track jump are repeated until the present A time reaches the target A-time.

On the other hand, where the present A-time is different from the target A-time more than 1 minute in the step c, the present A-time and the target A-time are compared with each other to determine whether movement of the optical pick-up is in an inward direction or in an outward direction (step c). Then, in the step f, after the command data commanding count of the tracks is given to the command register 1 of FIG. 1, the predetermined value "81" is given so as to rapidly rotate a feed motor (not shown) which moves the optical pick-up, the optical pick-up is fed or moved in a direction in accordance with a result of the step e.

Next, in the step g, it is determined that the signal WQ generated on the external terminal 39 as shown in FIG. 1 becomes "0" after the same becomes "1". When it is detected that the signal WQ is changed from "1" to "0", a value of tens of minutes of the present A-time is added twice (subtracted in the case of an inward direction) to (from) a value of units of seconds of the present A-time which is read in the step b. Such an operation evaluates or determines that the value of tens of minutes of the present A-time is in what rank or range divided by the time unit of 5 minutes, and time difference between a reference value of 12 seconds is added to the value of units of seconds.

Then, it is determined whether or not the value of units of minutes of the present A-time is more than "5", if more than "5", "13" is added (or subtracted) to (or from) the value of units of seconds and, if less than "5", "12" is added (or subtracted) to (or from) the value of units of seconds. Whereby, a time period equal to track number of "81" corresponding to the time unit of 5 minutes is added or subtracted to or from the present A-time, and the result becomes a new present A-time (step h).

In the step i, it is determined whether or not the present A-time calculated as the above exceeds the target A-time. If not reaching the target A-time, the process returns the step g to determine the signal WQ again and to make operation of the step h. At this time, as the present A-time, the present A-time which is newly evaluated in calculation in the previous step is used. On the other hand, if the target A-time is exceeded in the step i, feeding or movement of the optical pick-up is stopped, and after sending the command data commanding stop of count the tracks to the command register 1, the process returns the step b again.

Then, the same or similar operation is executed by reading the real present A-time from the track to which the optical pick-up has been moved. Therefore, by counting tracks, if it is determined that the present A-time becomes within 1 minute with respect to the target A-time, that is, the target track, it is possible to find out the target track by track jump.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A track search circuit for searching a number of tracks, comprising:
   command register means for storing command data and numeral value data indicative of a predetermined value N from an external value data indicative of a predetermined value N from an external control circuit;
   command decoder means for detecting that the command data being stored in said command register means commands a count of the number of tracks based upon an output of said command register means and for generating a detection output;
   counter means for receiving and counting a tracking error signal applied from an optical pick-up;
   coincidence detection circuit means for receiving an output of said counter means and an output of said command register means and for detecting that the counted value of said counter means reaches a value M smaller than said predetermined value N to generate a first detection output and for detecting that the counted value of said counter means reaches the predetermined value N to generate a second detection output;
   flip-flop means for being set by the first detection output of said coincidence detection circuit and for generating a signal which is applied to the external control circuit to be used for searching a track; and
   reset circuit means for generating a signal for resetting said counter means and said flip-flop in response to said second detection output of said coincidence detection circuit means.

2. A track search circuit in accordance with claim 1, wherein said coincidence detection circuit means generates said first detection output in response to detection of that the counted value of said counter means reaches ½ of said predetermined value N and generates said second detection output in response to detection of that the counted value of said counter means reaching said predetermined value N.

3. A track search circuit for searching a number of tracks having track numbers, comprising:
   command register means for storing command data and numeral value data indicative of a predetermined value N from an external control circuit;
   command decoder means for detecting that the command data being stored in said command register means commands a count of the track number, that the command data commands a track jump of 4n (n=0, 1, 2, ...) in an outward direction, and that the command data commands a track jump of 4n (n=0, 1, 2, ...) in an inward direction, and generates respective detection outputs;
   counter means for receiving and counting tracking error signal applied from an optical pick-up;
   selection circuit means for receiving an output of said counter means and a detection output from said command decoder means and for selectively outputting a counted output of said counter based upon the detection output;

means for reading information from a track;

tracking servo circuit means for controlling said means for reading information from a track in accordance with an input of said selection circuit means tracking control pulse generation circuit means for applying an acceleration pulse or deceleration pulse to said tracking servo circuit means to control said means for reading information from a track in accordance with an output of said selection circuit means;

coincidence detection circuit means for receiving an output of said counter means and an output of said command register means and for detecting that a counted value of said counter means becomes a value M smaller than that said predetermined value N to generate a first detection output and that a counted value of said counter means reaches said predetermined value N to generate a second detection output;

flip-flop means for being set by said first detection output of said coincidence detection circuit means for generating an output which is applied to the external control circuit;

reset circuit means for resetting said counter means and said flip-flop in response to said second detection output of said coincidence detection circuit means, said command decoder means serving for operation of said reset circuit means is enabled and operation of said tracking control pulse generation means is stopped by a detection output which is outputted when said command decoder means detects the command data commanding count of the predetermined value N, whereby 4n-track jump function or track counting function for counting the track number of the predetermined value N is switched.

* * * * *